UNITED STATES PATENT OFFICE.

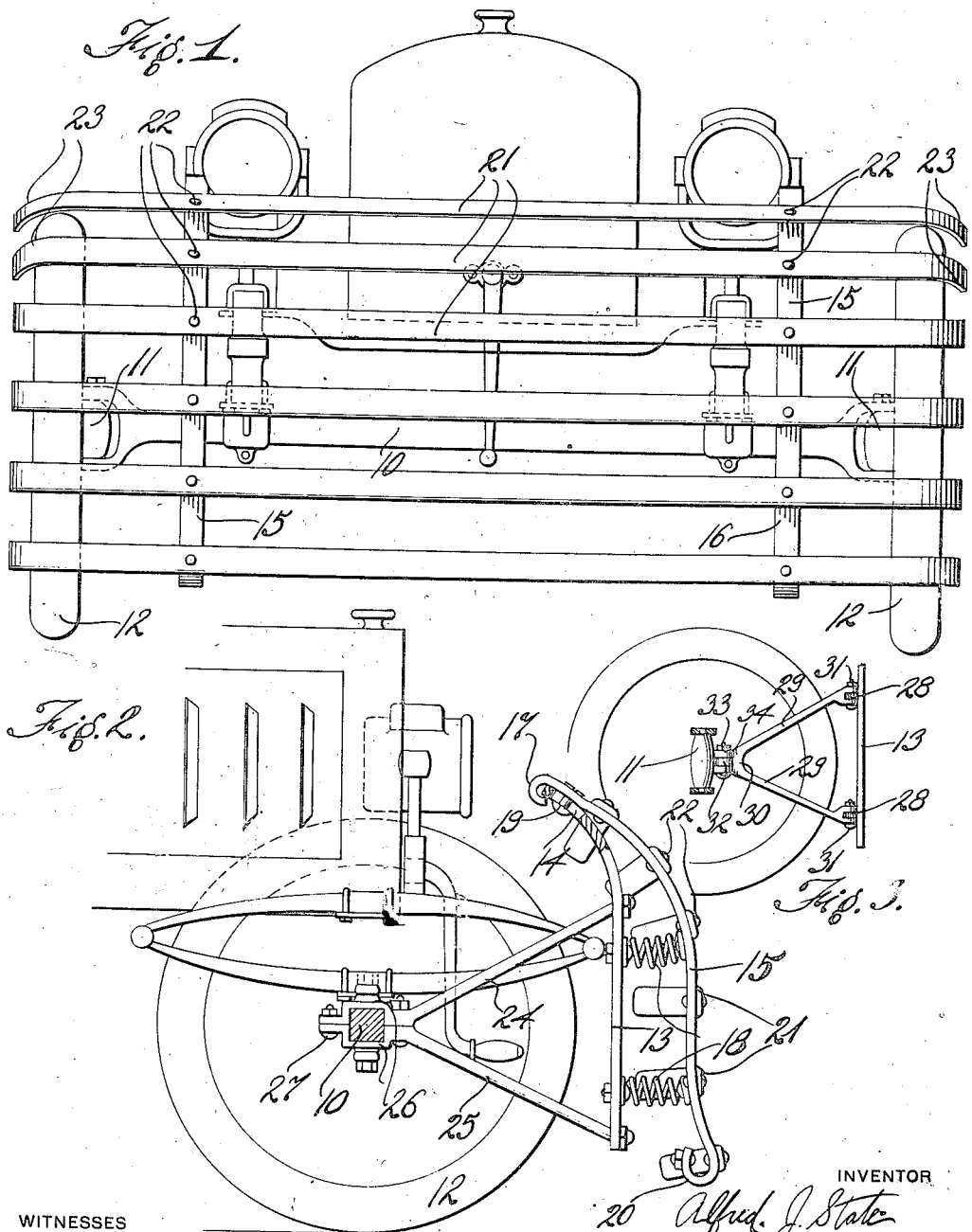

ALFRED J. STATE, OF MONTREAL, QUEBEC, CANADA.

AUTOMOBILE-FENDER.

1,211,887.  Specification of Letters Patent.  Patented Jan. 9, 1917.

Application filed December 30, 1915. Serial No. 69,428.

*To all whom it may concern:*

Be it known that I, ALFRED J. STATE, a subject of the King of Great Britain, residing at Montreal, in the Province of Quebec and Dominion of Canada, have invented certain new and useful Improvements in Automobile-Fenders, of which the following is a specification.

My present invention has relation to certain new and useful improvements in automobile fenders and, more particularly comprehends an improved fender structure that may be quickly and easily arranged in place in connection with the automobile and which is formed to yield slightly upon engagement with the obstruction so as to absorb and compensate for the shock which would otherwise be transmitted to the body of the machine.

Another object of my invention is to provide an improved fender of this nature that may be mounted on the stub axle of the machine so that it will move in consistence with the front wheels thereof, the latter being fully protected at all times.

A further object of my invention is to provide a device of the type in question that is extremely simple in construction, strong and durable, and highly practical from both the standpoint of the manufacturer and the standpoint of the user; and which, it is believed, may be manufactured at a comparatively low cost.

Various objects and advantages will become apparent during the continuance of the following description.

These objects are accomplished by such means as are shown in their preferred form in the accompanying drawings, described in the following specification and then more specifically pointed out in the appended claims.

In the accompanying drawings wherein like characters designate like parts throughout the several views:—Figure 1 is a view in front elevation of my improved fender, showing the same attached to an automobile of substantially the conventional form; Fig. 2 is a view in side elevation of the fender showing part thereof broken away; Fig. 3 is a view in detail of means for connecting the fender with the stud axle of the machine.

In the drawing, I have shown an automobile which is of substantially the conventional form, and which includes a carrying axle 10 that pivotally supports stub axles 11 that are in turn supported by the usual wheels 12. Although I have shown this type of automobile in connection with my invention, it is to be understood that I do not limit myself in any manner to this specific application, since my invention is readily applicable to other forms of automobiles now in use.

In reducing my invention to practice, I first provide spaced supporting irons 13 (see Fig. 2) which are slightly curved toward their upper ends and slotted as at 14. These supporting irons are preferably formed of a durable metal, and preferably a rigid one, whereby they may be fully capable of supporting the main fender structure as well as readily susceptible of attachment to the respective axle. I next provide spaced carrying arms 15 and 16 respectively, whose upper ends are curved as at 17 to embrace the upper ends of the supporting irons 13 while their intermediate portions and other ends are normally held in spaced relation to the supporting irons through the instrumentality of suitable resilient means, such for instance as the coil springs 18. These carrying arms may be constructed of any desirable material yet it is pointed out that a resilient metal will suffice.

Adjacent their upper ends, the carrying arms 15 are provided with suitable headed studs 19 whose shank portion is passed through the slots 14, in the manner clearly shown in Fig. 2, thus retaining the arms against accidental dislodgment yet permitting slight sliding movement thereof with respect to the irons 13. Adjacent their lower ends, the arms may be suitably curved as at 20 to form suitably curved abutments which will eliminate premature breaking or splitting of the ends of the arms.

A series of horizontally disposed rod members 21 that are preferably formed of a spring metal may be fixed to the respective carrying arms 13, such as shown at 22 to have their curved end portions 23 overhang the tread area of the wheels 12. In other words, the rod members are made of a length to project to each side of the wheels whereby protection will be afforded the latter at all times. As before stated the rod members are preferably formed of a springy material whereby they will act in coöperation with the springs 18 when the fender is engaged with an obstruction.

Any desirable means may be employed for supporting the fender in connection with the automobile, and it is pointed out that the same may be carried on the main axle 10 or the stub axles 11. When carried on the main axle, the fender will be held stationary at all times, whereas, on the other hand, by mounting the same on the stub axles, it will be moved consistently with the movement of the steering gear thus affording protection to the front wheels at all times. In Fig. 2 I have shown the same mounted on the main axle 10 while in Fig. 3, the same is shown connected with the stub axles.

In Fig. 2, I provide each of the irons 13 with rearwardly projecting supporting arms 24 and 25 respectively, whose rear ends are in turn formed into suitable bearings 26 that may be positioned about and fastened to the axle 10 as at 27. This construction permits the quick and easy attachment or removal of the fender from the machine yet retains the same in an advantageous position in accordance with the desire of the operator.

In the other form, such as shown in Fig. 3, I provide each of the irons 13 with projecting ears 28 for connection with the arms 29 of a branch member 30, as at 31. This is preferably made a loose connection in order to permit the independent lateral movement of the arms 29 at certain times. The respective stub axles 11 are in turn provided with projecting ears 32 which are fixedly connected as at 33 with the bifurcated portion 34 of the branched member. Consequently, it will be noted that upon movement of the stub axle, the fender will be likewise shifted into a position whereby it will be in front of the machine and protect the front wheels thereof, at all times. This type of fender also serves to effectually protect the front lamps or head lights of the machine as well as the projecting portions of the supporting springs and the cranking handle.

From the foregoing, it is believed that the advantages and novel features of my invention will be readily understood and, therefore, further detail description is deemed unnecessary.

In reducing my invention to practice, I find that the form referred to here as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim as new and desire to secure by Letters Patent is:—

1. In a device of the character described, supporting irons associated with the automobile and disposed vertically with respect thereto, a guard loosely connected at its upper edge to said supporting irons and disposed transversely with respect to the automobile, and means to yieldingly retain the lower end of said guard in spaced relation to said supporting irons, for the purpose specified.

2. In an automobile fender, supporting irons carried by the automobile and disposed vertically with respect thereto, carrying arms loosely connected at their upper ends to the upper ends of said irons, means to yieldingly retain ends of said carrying arms in spaced relation to said irons, and a plurality of guard members associated with the carrying arms and bodily movable therewith, for the purpose specified.

3. In an automobile fender, supporting irons associated with the automobile and disposed vertically with respect thereto, carrying arms slidably connected at their upper ends with the upper ends of said supporting irons, means to yieldingly retain the lower ends of said carrying arms in spaced relation to said supporting irons, and a series of guard members connecting said carrying arms and movable therewith, for the purpose specified.

4. In an automobile fender of the character described, supporting irons to be carried by the automobile, carrying arms connected at one end with said irons to be slidable longitudinally with respect thereto, resilient means to normally space the intermediate portions and the other end of said carrying arm from said irons, and a plurality of guard members carried by said arms, and movable together therewith, as and for the purpose specified.

5. In an automobile fender, supporting irons supported by the automobile and disposed vertically with respect thereto, carrying arms, means slidably connecting the upper ends of said carrying arms and the upper ends of said supporting irons, the upper end of said carrying arms being curved to overlie the upper ends of said supporting irons, means to yieldingly retain the lower portion of said carrying arms in spaced relation to said supporting irons, and a series of guard members associated with said carrying arms and movable therewith, substantially as described.

6. In an automobile fender of the character described, supporting irons to be carried by the automobile, carrying arms having their upper ends bent to overlie the upper ends of said supporting irons, resilient means to space the other end of said carrying arm from said supporting irons, and a plurality of guard members associated with said carrying arm and arranged to overlie the tread area of the front wheels of the machine, as and for the purpose specified.

7. In an automobile fender of the character described, supporting irons to be carried by the automobile, said supporting irons provided with flaps adjacent their upper ends, carrying arms having their upper ends bent to overlie the upper ends of said supporting irons, studs on said carrying arms to be received into said slots, spaced coil springs to normally retain the intermediate portions and the other end of said carrying arm in spaced relation to said supporting irons, and a plurality of laterally arranged guard members associated with said carrying arms to project beyond the plane of the front wheels of the machine, and afford protection therefor, as and for the purpose specified.

In testimony whereof I affix my signature in presence of two witnesses.

ALFRED J. STATE.

Witnesses:
　JAMES R. LAW,
　GEO. E. CHART.